Figure 1:
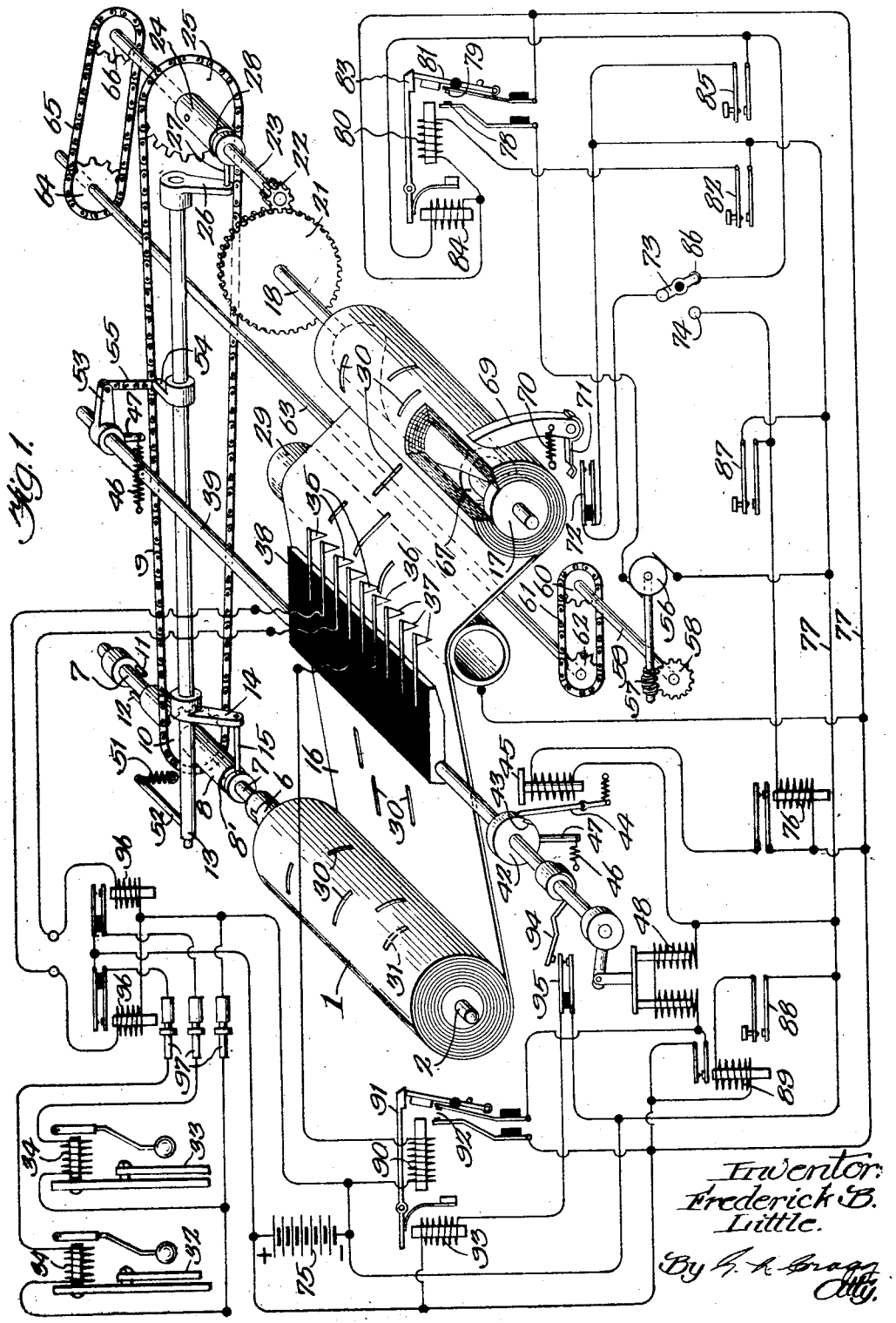

Nov. 3, 1925.

F. B. LITTLE 1,559,758

CONTROLLING MECHANISM

Filed April 28, 1924

8 Sheets-Sheet 4

Inventor:
Frederick B. Little

Nov. 3, 1925.

F. B. LITTLE 1,559,758

CONTROLLING MECHANISM

Filed April 28, 1924    8 Sheets-Sheet 5

Inventor
Frederick B. Little
By G. L. Cragg  Atty.

Nov. 3, 1925.

F. B. LITTLE 1,559,758

CONTROLLING MECHANISM

Filed April 28, 1924   8 Sheets-Sheet 6

Inventor:
Frederick B. Little
By G. R. Bragg  Atty.

Nov. 3, 1925.
F. B. LITTLE
1,559,758
CONTROLLING MECHANISM
Filed April 28, 1924   8 Sheets-Sheet 7
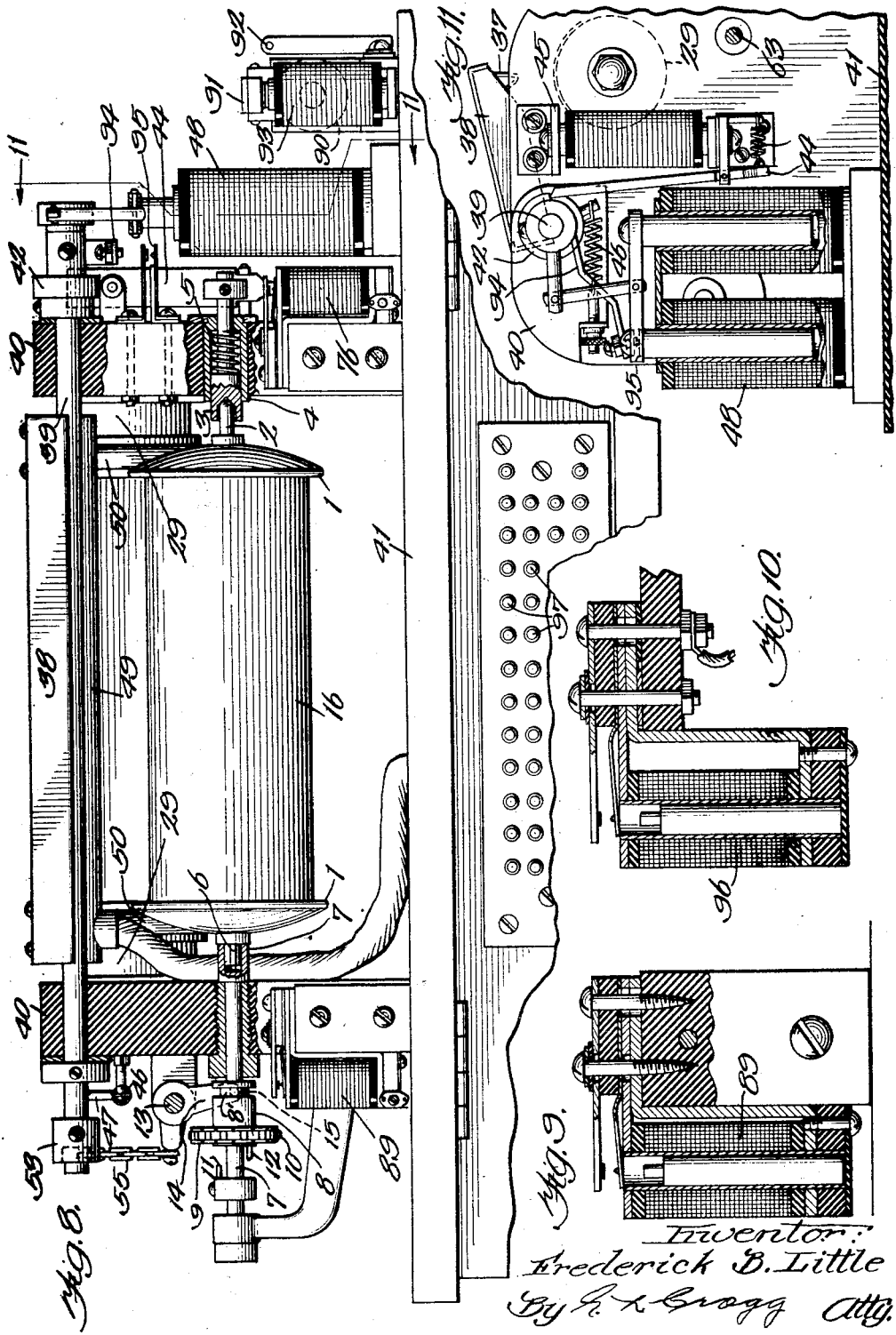
Inventor:
Frederick B. Little
By G. L. Gragg  Atty.

Nov. 3, 1925.
F. B. LITTLE
1,559,758
CONTROLLING MECHANISM
Filed April 28, 1924    8 Sheets-Sheet 8
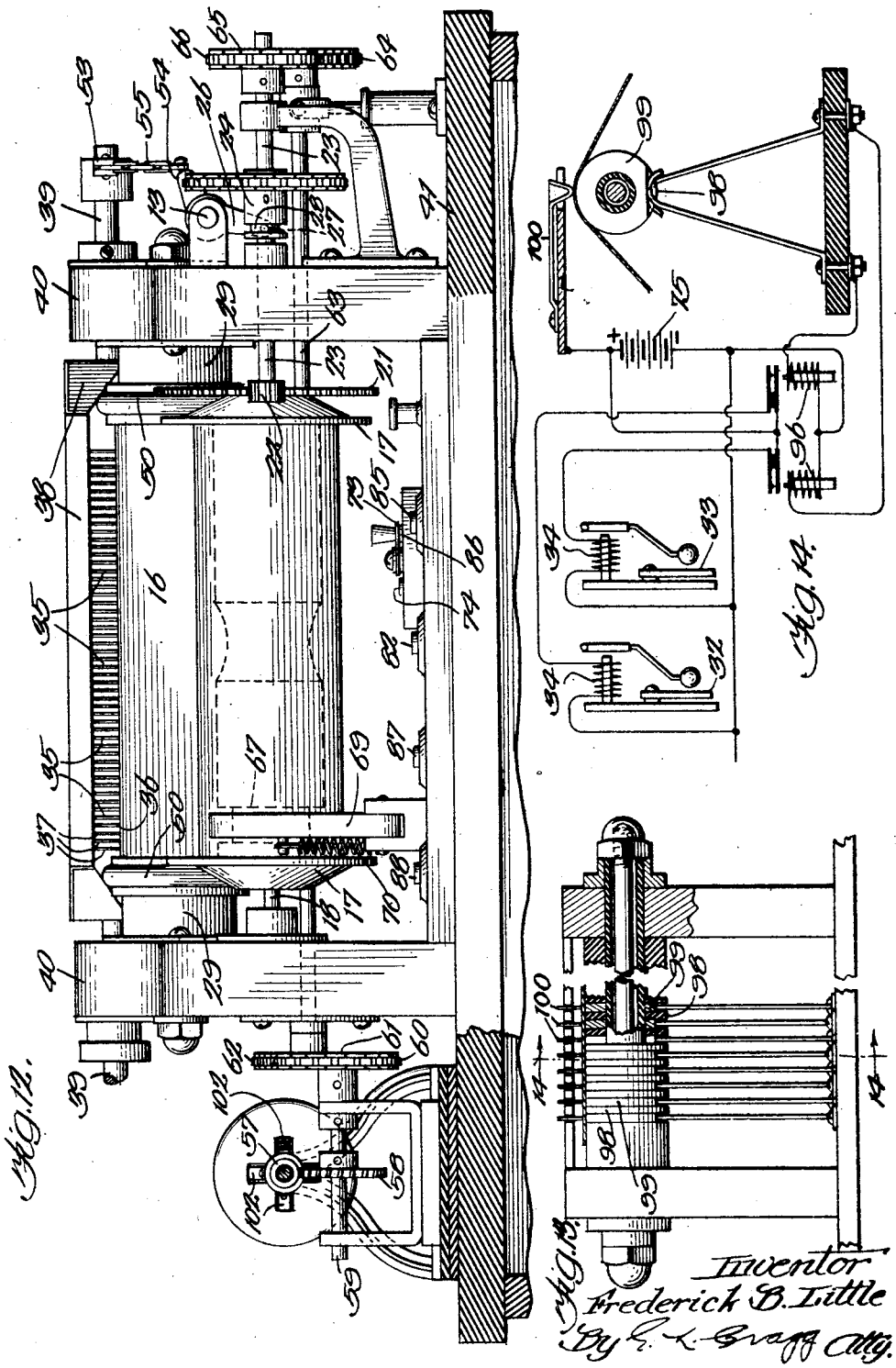

Patented Nov. 3, 1925.

1,559,758

UNITED STATES PATENT OFFICE.

FREDERICK B. LITTLE, OF CHICAGO, ILLINOIS, ASSIGNOR TO J. C. DEAGAN, INCORPORATED, OF CHICAGO, ILLINOIS, A CORPORATION OF ILLINOIS.

CONTROLLING MECHANISM.

Application filed April 28, 1924. Serial No. 709,707.

*To all whom it may concern:*

Be it known that I, FREDERICK B. LITTLE, a citizen of the United States, residing at Chicago, in the county of Cook and the State of Illinois, have invented a certain new and useful Improvement in Controlling Mechanism, of which the following is a full, clear, concise, and exact description.

My invention relates to controllers employing electromagnetic responsive devices that are in controlling relation to instrumentalities whose operation is to be governed.

My invention is of particular utility in connection with sound or music producing instruments which have electromagnetic operating mechanism that is controlled by the electromagnetic responsive devices, though the invention is not to be thus limited.

The controlling electromagnetic mechanism has circuits governing the same and governed thereby and in turn governed by the portion of the instrument that is in direct control of the sound producing means or other devices which are to be operated by the instrument, there being also manually controlled devices that take part in governing the circuit system.

The instrument of my invention is such that the operating mechanism of the instrument may be limited to one cycle of operations or may have its cycle of operations repeated ad libitum or may be limited to a fraction of its cycle of operations. While the instrument of my invention is preferably capable of the flexible control thereof specified, the invention is not to be thus limited.

In the preferred embodiment of the invention the operation of the instrument is governed by a control sheet which is provided with openings or has other formations co-operating with switching means that enable the instrument to have automatic control of some of the circuits, as well as defining the intervals of operation of the sound producing or other devices pertaining to the instrument, if such devices are to be electromagnetically operated, it being understood that the invention is not to be thus limited.

Two mandrels are employed, one for carrying the supply roll from which the control sheet is unwound to operate the instrument, and the other for carrying the take up roll on to which the sheet is wound from the first roll. Manually controlled setting mechanism serves to adjust the instrument to enable its operation, to cause its operation to cease, or to cause repetition of the cycle of operations or selecting the fraction of such cycle that is to be alone affected or repeated.

Figure 2:
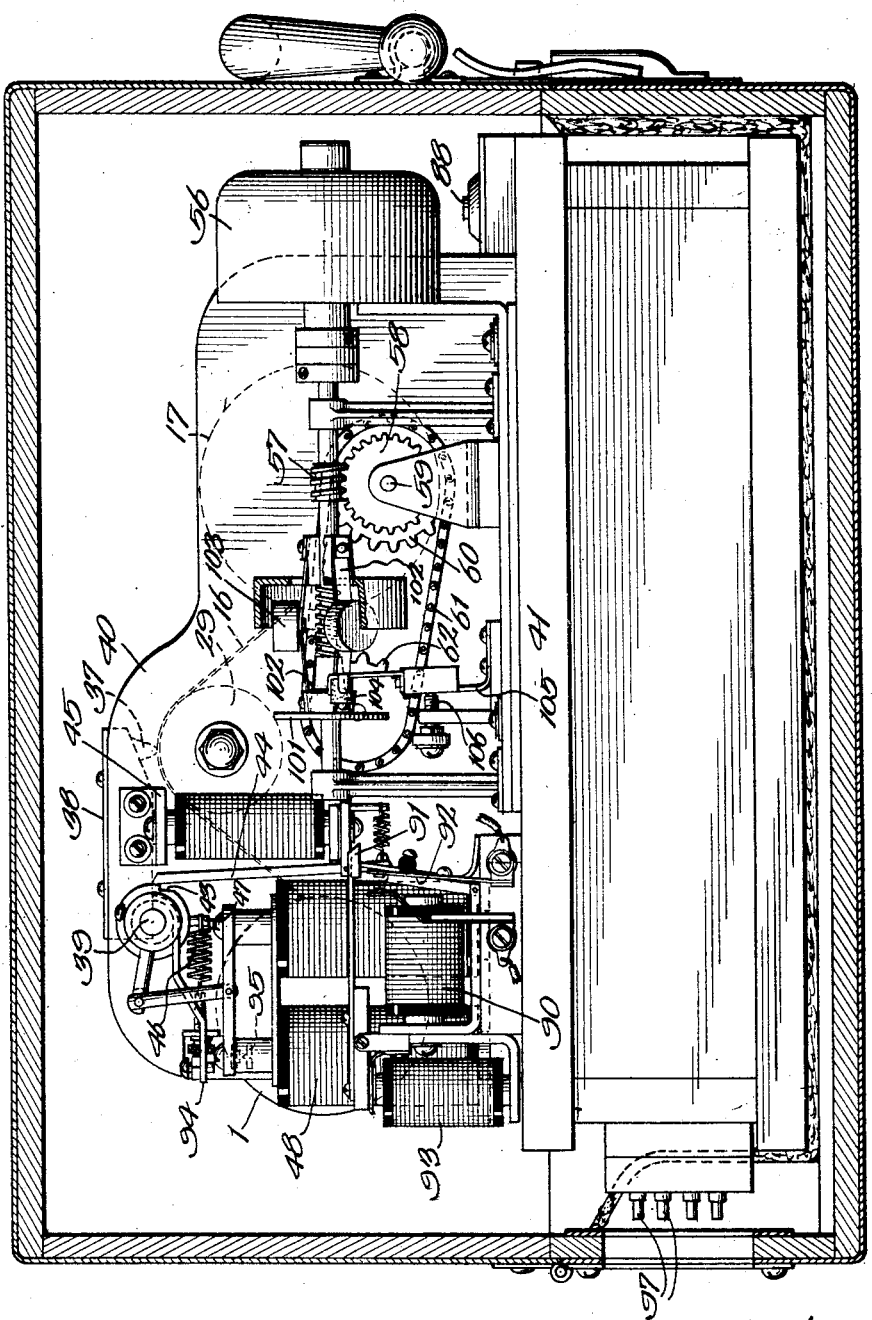
Figure 3:
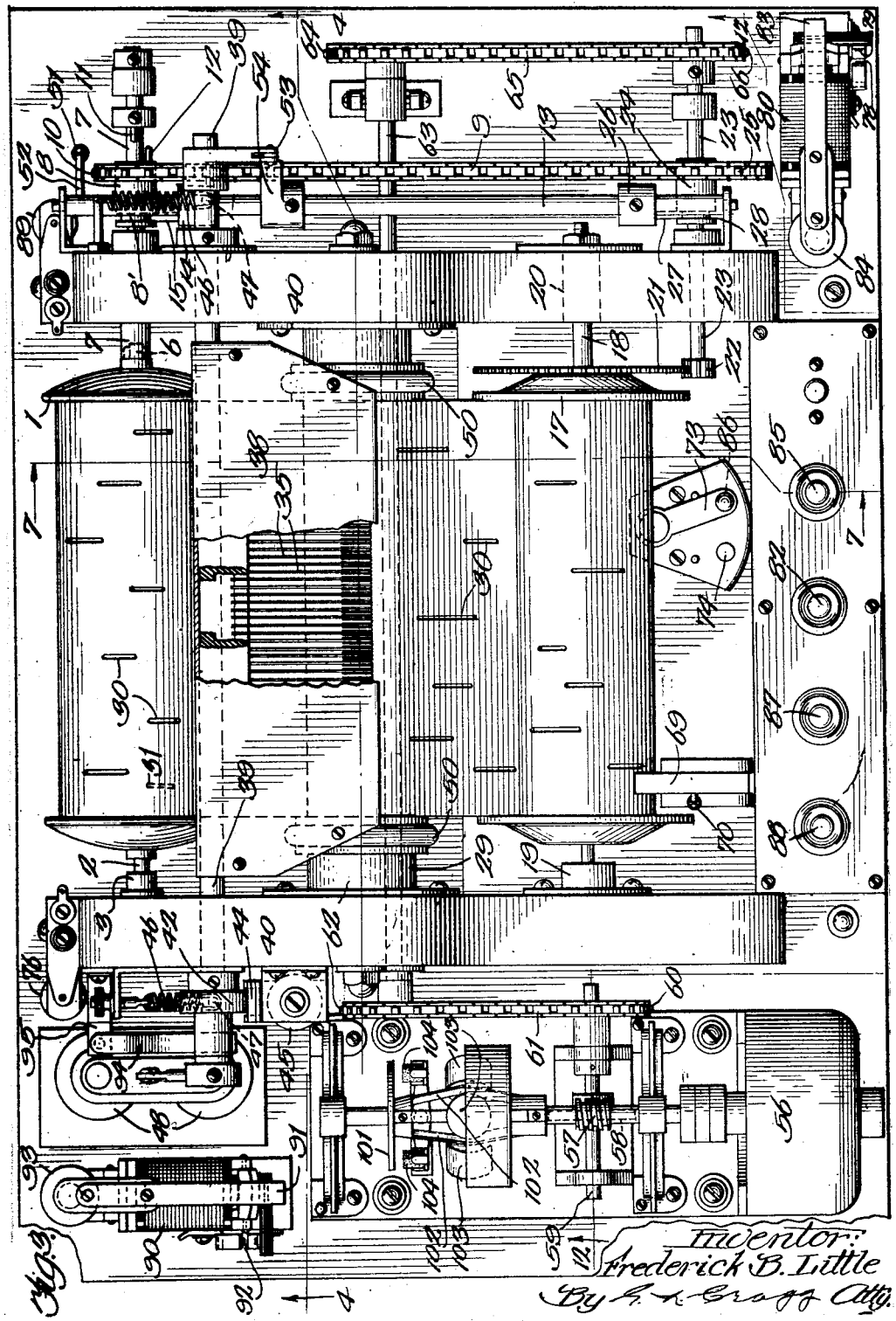
Figure 4:
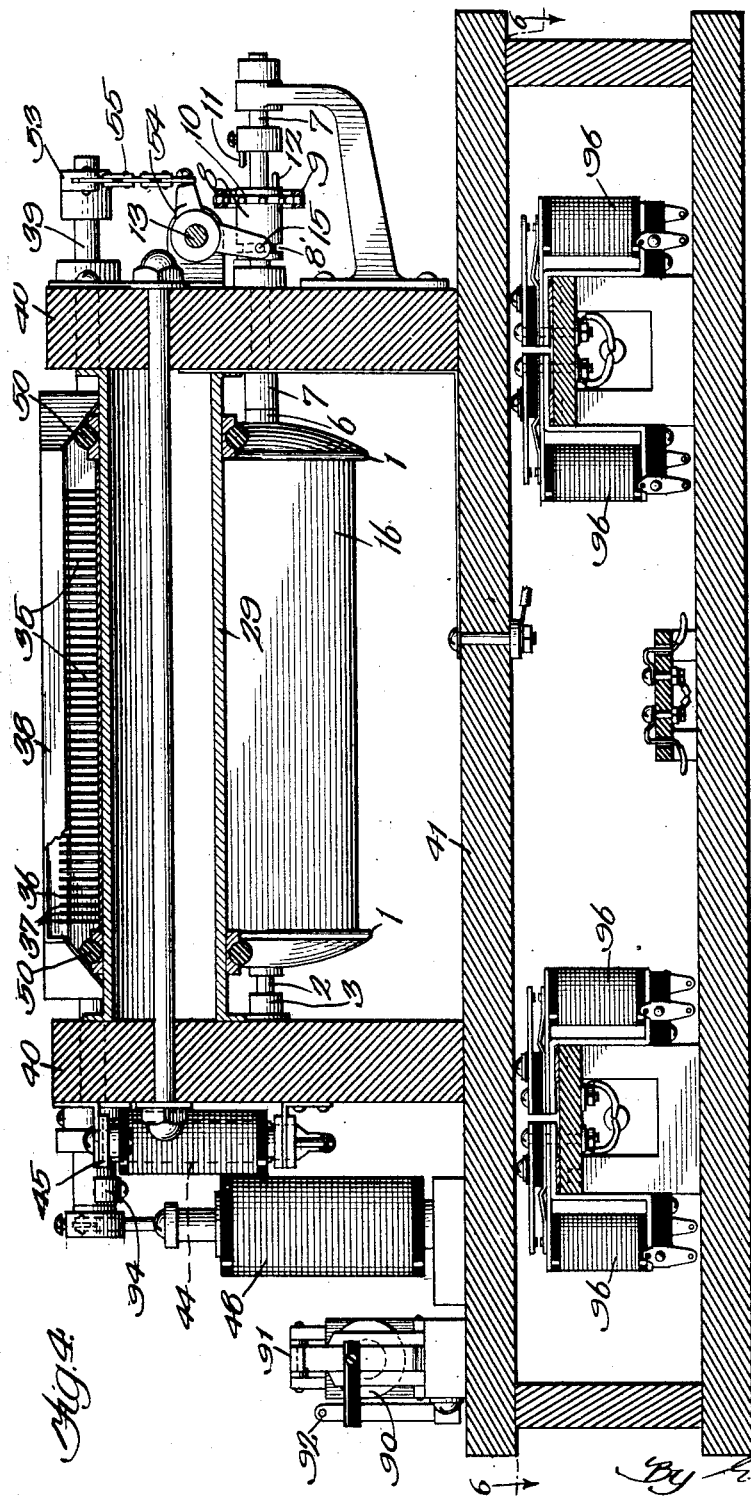
Figure 5:
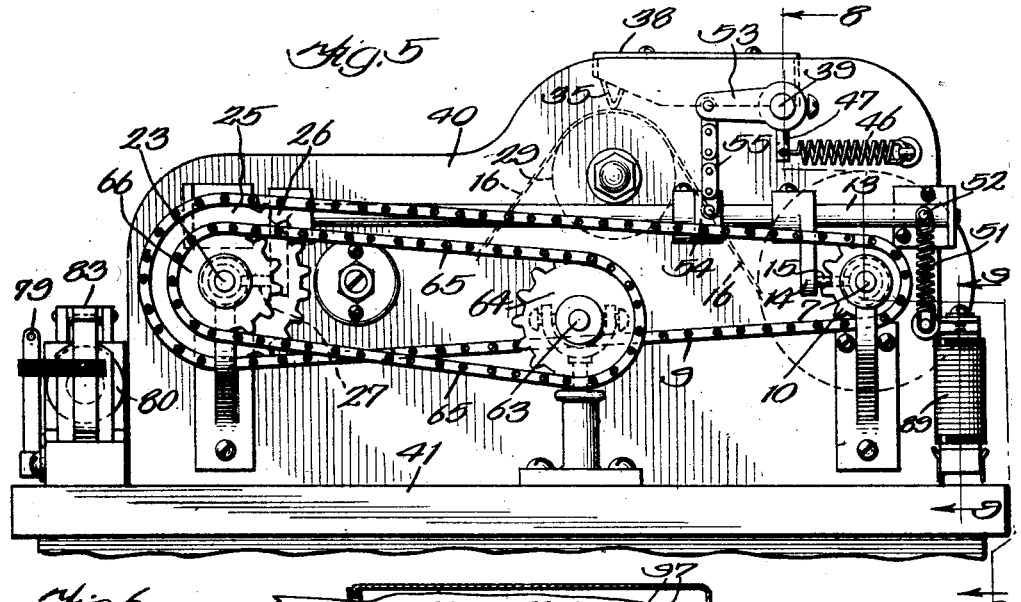
Figure 6:
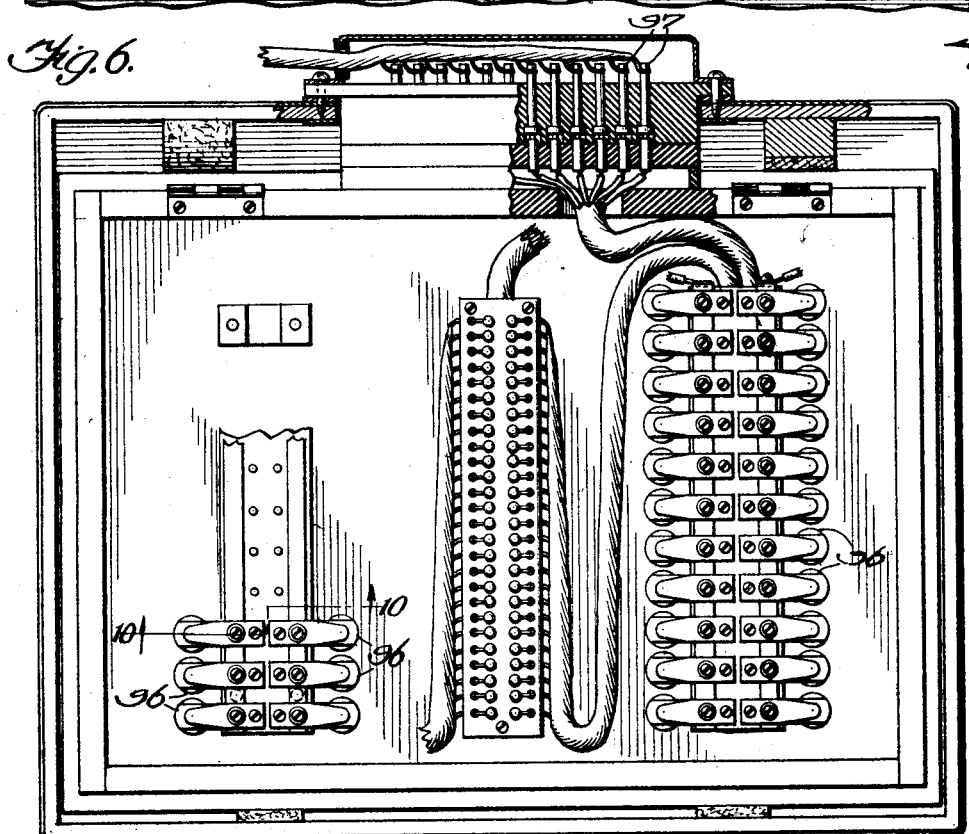
Figure 7:
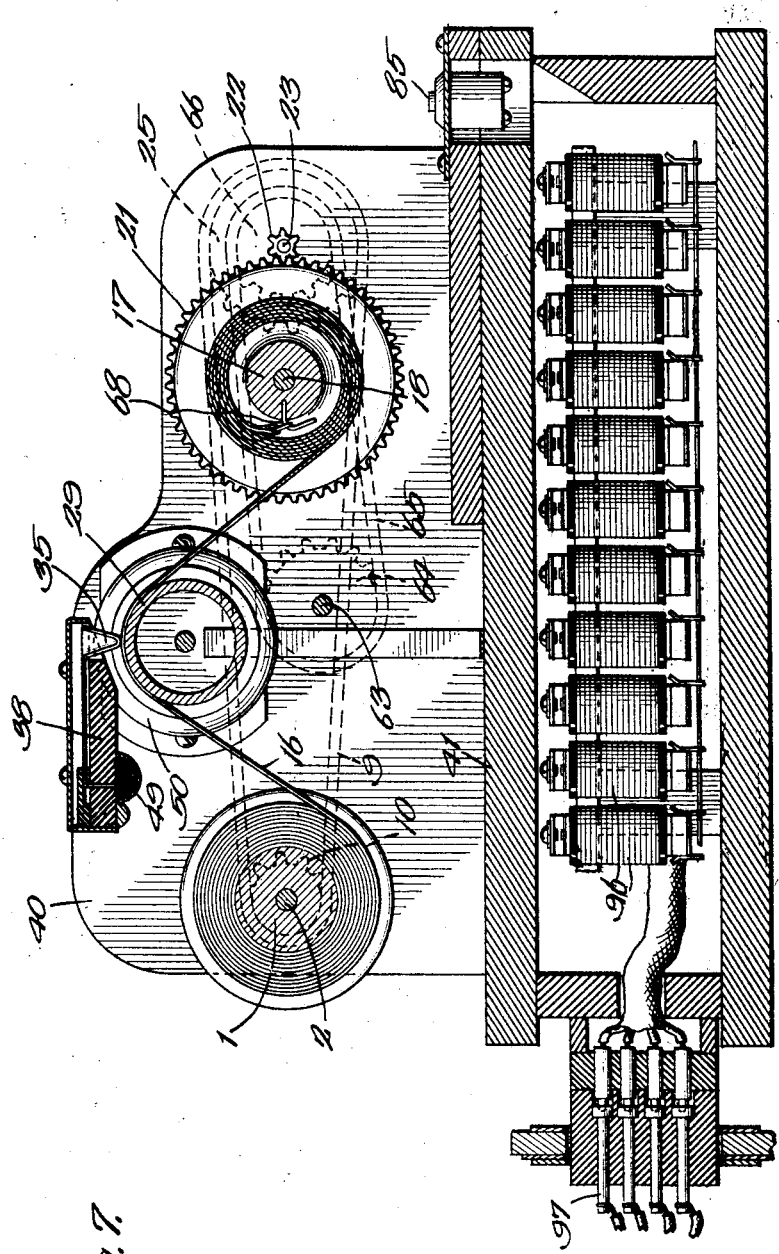

The invention will be more fully explained in connection with the accompanying drawings in which Fig. 1 is a diagrammatic view illustrating the mechanism and controlling circuits of an instrument constructed in accordance with the preferred embodiment of the invention, the instrument illustrated being adapted for the production of sounds; Fig. 2 is a side elevation of the instrument with its enclosing casing shown in section; Fig. 3 is a plan view of the instrument minus its casing; Fig. 4 is a sectional view on line 4—4 of Fig. 3; Fig. 5 is a view of the side of the instrument opposite to that illustrated in Fig. 2; Fig. 6 is a sectional view on line 6—6 of Fig. 4; Fig. 7 is a sectional view on line 7—7 of Fig. 3; Fig. 8 is a sectional view on line 8—8 of Fig. 5; Fig. 9 is a sectional view on line 9—9 of Fig. 5; Fig. 10 is a sectional view on line 10—10 of Fig. 6; Fig. 11 is a sectional view on line 11—11 of Fig. 8; Fig. 12 is a sectional view on line 12—12 of Fig. 3; Fig. 13 is a view illustrating a modification; and Fig. 14 is a sectional view on line 14—14 of Fig. 13 together with a diagram of the circuits and apparatus therewith associated.

Like parts are indicated by similar characters of reference throughout the different figures.

A supply roll 1 has a shaft 2 which is smooth at one end to be received and turned within a bearing 3 that is mounted to slide in a sleeve 4, this bearing being pressed toward the roll by a spring 5 within said sleeve, in accordance with common practice, this spring creating enough friction to prevent the supply roll from running too freely when running idly. The other end of the shaft 2 may be provided with the usual key formation 6 receivable within the correspondingly shaped bore of the driving shaft 7. The admission of the keyed end of the shaft 2 within the bore of the driving shaft 7 is effected after the other end of the shaft 2 is in circuit within the bearing 3 and this bearing is pressed toward the spring 5 sufficiently to bring the keyed end of the shaft 2 in suitable registry with the bore of the shaft 7.

A sleeve 8 is received and is loose upon a reduced portion of the shaft 7. This sleeve, during the operation of the instrument, is constantly driven in a uniform direction by means of a sprocket chain 9, also traveling in a uniform direction and constantly during the operation of the instrument, this sprocket chain engaging and driving a sprocket wheel 10 which is fixed upon the sleeve 8. The shaft 7 and the sleeve 8 carry complemental clutch members 11 and 12 which are preferably in the form of symmetrically related pins. The shaft 7 is driven when the sleeve 8 is moved upon it to bring the pin 12 that is upon the sleeve into the zone of the pin 11 that is upon the shaft. A rod 13 carries an arm 14 upon which there is provided a pin 15 which enters the annular groove 8, in the sleeve 8. When the instrument is adjusted for playing the rod 13 has been turned clockwise to bring the clutch members 12 and 11 out of engagement to permit the supply roll 1 to run idly, in order that the control sheet 16 may be unwound from the supply roll on to the take up roll 17, that is positively driven during the playing operation by mechanism that is to be described. After the control sheet has been unwound from the supply roll on to the take up roll to the full or desired extent the take up roll is adjusted to run idly and the rod 13 is turned counter clockwise, as viewed in Fig. 1, to bring the clutch members 12 into the zone of the clutch member 11 to enable the supply roll to be positively rotated in a direction reverse to that in which it was idly rotated during the playing operation in order to rewind the sheet upon the supply roll.

The take up roll is provided with a shaft 18 which is permanently located within bearings 19 and 20, in accordance with common practice. A spur gear 21 is fixed upon the shaft 18, this spur gear being engaged by a pinion 22 when the take up roll is to be positively driven, this pinion being withdrawn from engagement with this gear when the take up roll is to run idly. The pinion 22 is carried upon a shaft 23 upon which there is fixed a sleeve or shaft enlargement 24. This shaft enlargement carries a spur gear 25 which is rotated in a uniform direction by the aforesaid sprocket chain 9. Rod 13 carries an arm 26 upon which there is a pin 27 that enters the annular groove 28 in the shaft enlargement 24. When the rod 13 is adjusted to permit the supply roll 1 to run idly it also serves so to swing the arm 26 as to bring the pinion 22 into mesh with the gear 21 to cause the take up roll to be run positively. When the rod 13 is reversely adjusted to enable the supply roll to be driven positively in the rewinding operation it shifts the pinion 22 out of the plane of the gear 21 to permit the take up roll then to run idly.

In the embodiment of the invention illustrated in all of the figures except Figs. 13 and 14, the control sheet 16 rides over and is placed under suitable tension by the metallic platen 29. In the instrument illustrated in Figs. 1 to 12, the control sheet has circuit control formations 30, 31 that are preferably produced by slotting the sheet longitudinally thereof. These openings are disposed crosswise of the sheet with the openings 30 in rows extending longitudinally of the sheet, the openings in the different rows having suitably selected relative positions to control the operation of various sound producing and other devices in selected sequence.

A plurality of sounding devices 32, 33 is illustrated, each sounding device having an operating electromagnet 34 individual thereto, in the event that the sounds are to be produced by electromagnetic mechanism. In such event, each magnet 34 is associated with a switch arm 35 individual thereto, these switch arms being spaced apart longitudinally of the platen 29 so as to be each individual to and in line with a longitudinal row of openings 30. Another switch arm 36 is spaced longitudinally of the platen 29 from the arms 35 and is aligned with the single opening 31 to which it is individual, for the purpose of effecting the control hereafter to be specified. Other switch arms 37 may be provided for other purposes, these latter switch arms being spaced apart from each other and from the previously mentioned switch arms longitudinally of the platen 29 and each being individual to a longitudinal row of openings 30 for the purpose of enabling the performance of other functions to serve other purposes. All of the switch arms, which are preferably metallic throughout, are mounted upon an insulating board 38 which faces the sheet and is mounted upon a controlling rod or member 39 extending crosswise of the chain 9 and parallel with the roll supporting mandrels. This controlling member is mounted to turn or oscillate in the supports 40 that are carried by the base board 41, this member thus being movable in opposite directions angularly to the plane of the sheet. The rod 39 may be slightly turned in one direction to lower the switch arms when the instrument is to be operated so that the V shaped contacts upon the ends of the arms may ride upon the control sheets 16 and enter the openings 30 as these openings are being passed beneath the contacting ends of the arms, while the sheet is being wound upon the take up roll from the supply roll, the arm then having electrical connection with the metallic platen 29 to effect circuit closures as will appear. When the instrument is to cease its performance the rod 39 is turned to lift the switch arms. The rod 39 carries a disk 42 fixed thereon, this disk having a notch 43 which is engaged by a self acting detent 44 when the spring arm carrier 38 is raised to lift the switch arms thereon. When the instrument is to be set into operation the detent 44 is withdrawn by the magnet 45 to permit the springs 46 to turn the rod 39 in a clockwise direction to lower the switch arms into functioning positions, these springs pulling in a clockwise direction upon the arms 47 carried by the rod 39. As will appear, the magnet 45 is instantly deenergized after it has withdrawn the detent 44, the detent being held in its withdrawn position upon the unnotched part of the disk 42, this adjustment being maintained during the operation of the instrument. When the instrument is to be stopped, the magnet or solenoid 48 is energized to turn the rod 39 in a counter clockwise direction to lift the switch arms which are held in their lifted position by the re-engagement of the detent 44 with the notch 43. As will appear, the solenoid 48 is de-energized immediately after it performs its function.

The insulating carrier 38 for the switch arms carries a group of wires 49 (Fig. 7) for the switch arms, upon its bottom side, Fig. 7. The switch arms are assembled, at their rear ends only, with the carrier 38 and this carrier rides upon the bearers 50 to relieve the switch arms of the weight of the carrier and to permit the contacting ends of the switch arms to press upon the control sheet 16 with a pressure that is due solely to the resilience of the switch arms. The rod 39, when adjusting the switch arms into or out of functioning position, also correspondingly adjusts or permits the adjustment of the rod 13. When the rod 39 is turned in a counter clockwise direction to lift the switch arms and their support 38 at the conclusion of the operation of the instrument, the shaft 13 is turned in a counter clockwise direction through the intermediation of the arm 53 upon the arm 39, the arm 54 upon the rod 13, and the chain or other flexible member 55 connecting these arms, with the result that the sleeve 8 is coupled with the shaft 7 through the intermediation of the clutch members 12 and 11 to positively reversely rotate the supply roll and with the further result that the pinion 22 is moved out of mesh with the gear 21 to permit the take up roll to run idly. An electric motor 56 is preferably employed for driving the sprocket chain 9 in a uniform direction. As illustrated, the shaft of this motor carries a worm 57 in mesh with the worm wheel 58 upon a shaft 59 which carries a sprocket pinion 60. A sprocket chain 61 is in mesh with this pinion and with another pinion 62. The latter pinion is upon a shaft 63 which carries an additional pinion 64 that is in mesh with a sprocket chain 65. This sprocket chain is in mesh with a second pinion 66 upon the shaft 23 which carries the pinion 22. The planes of rotation of the pinions 62 and 64 are preferably fixed. The sprocket chain 65 permits the planes of rotation of the pinions 22 and 66 to be shifted. The plane of rotation of sprocket wheels 10 and 25 is also shiftable with respect to the planes of the pinions 62 and 64, the axially shiftable gear wheels 10 and 25 remaining in the same plane with respect to each other.

The take up roll is formed with an annular groove or recess 67 near one end thereof and in the zone of the control sheet. This groove is covered by the control sheet when the take up roll is positively driven to wind the sheet thereon and unwind it from the supply roll. Initially, however, the leading end of the control sheet, which is connected with the hook 68 upon the take up roll, does not entirely cover the annular recess 67 but leaves it sufficiently open to receive the free end of the arm 69 which is then pressed into the groove by the spring 70. When the take up roll is positively driven, the leading end of the control sheet acts as a cam to lift the arm 69 out of the annular recess 67. The arm 69 carries an angular extension 71 which is in circuit closing relation to a switch 72 when the arm 69 extends into the annular groove, said switch being thus closed before the instrument is started into operation and self opening when the arm 71 is removed therefrom consequent upon the engagement of the control sheet with the arm 69 after the instrument is started. The upper contact of the switch 72 that is operable by the arm 71 is connected with a manually controlled switch arm 73. When the instrument is to be started, this switch arm 73 is thrown into circuit closing engagement with the button 74, the resulting circuit being traceable from one terminal of the battery 75 or other source of current, which is desirably common to all of the electromagnetic devices of the instrument, through the electromagnet or relay 76, the contact button 74, the switch arm 73, the now closed switch 72 to the remaining terminal of said battery. The armature switch of relay 76 is included in a normally open bridge between the battery circuit sides 77, the electromagnet 45 being in the same bridge with this armature switch. When the relay is energized by the closure of the circuit by the arm 73 when placed in engagement with the contact button 74, the magnet 45 is energized to withdraw the detent 44 from the notch 43 in the disk 42 with the result that the springs 46 are free to lower the switch arms (upon the carrier 38) into operative relation with the control sheet and the metallic platen over which this sheet rides. As has hitherto been set forth, this adjustment of the switch arms and their carrier 38, effected through the intermediation of the rod 39, is also accompanied by the adjustment of the pinion 22 into mesh with the gear 21 in order that the take up roll may be positively driven, the sleeve 8 upon the shaft 7 being at the same time adjusted to bring the clutch member 12 thereon out of the zone of the clutch member 11 in order that the supply roll may be idly turned when the take up roll is positively driven. The instrument is now set for operation and is placed in operation by establishing the circuit for the motor 56. The motor circuit includes two contacts 78 and 79 adapted to carry the motor operating current, the motor circuit being closed when these contacts are engaged. A relay 80 is desirably employed for closing the switch 78, 79, the armature 81 of this relay being in actuating relation with the contact 79. The circuit for the relay 80 is closed by the manual switch 82 which is included in series with the relay winding and together therewith in bridge of the battery mains 77. When the relay 80 is energized its armature 81 is held in its attracted position by the detent 83 so that the motor circuit is maintained closed at the contact 78, 79, after the manual switch 82 is released. After the instrument has been operated as long as desired, whether through a single cycle of operations, a plurality of said cycles, or a fraction only, and to be held in the condition at which it stops the detent 83 is disengaged from the armature 81 through the agency of the releasing magnet 84, the circuit of the motor being consequently opened at 78, 79. The circuit of this releasing magnet is established by the closure of the manual switch 85 which is in series with the magnet 84 and included therewith in bridge with the battery mains 77. I may employ a manual switch 87 which is in the same bridge of the battery mains 77 with the relay 76. When this switch 87 is employed, the arm 73 is disengaged from the button 74. By closing the switch 87 the relay 76 is energized to energize the magnet 45 with the results that have been described.

When the instrument is no longer in operation it is desirable to lift the switch arms 35, etc., and their common mounting 38, to restore the sleeve 8 to nonclutching position and to place the pinion 22 in mesh with the gear 21 so that the instrument is adapted to be set instantly into operation either by the closure of the switch 87 or the closure of the switch 73. 74. This result is accomplished by means of the solenoid or magnet 48 as has hitherto been described. This solenoid may have its circuit established by the closure of the manually operated switch 88 in series with a relay 89 that is included in bridge of the battery main 77 with the switch. The armature switch of the relay 89 is in series with the solenoid winding 48 and in the same bridge with the battery mains therewith. Thus when the switch 88 is closed the armature switch of relay 89 is closed, to close the circuit of the solenoid 48 to raise the switch arms 35, etc., to adjust the sleeve 8 into an idling position, and to bring the pinion 22 into mesh with the gear 21, the detent 44 holding these adjustments.

The operation of the instrument may be automatically stopped with the aid of the switch arm 36 aligned with the opening 31 in the control sheet 16. This opening is at the trailing end of the control sheet so that the instrument may be stopped at the end of its cycle. If it is desired to stop the instrument at an intermediate portion of its cycle, a duplicate of the opening 31 may be provided. When this opening comes into register with the contacting end of the arm 36 a circuit is established which may be traced from one pole of the battery 75 to the matallic platen 79, the contacting end of the arm 36 then projecting through the opening 31 into contact with the platen 29, said contact arm, the relay 90 to the other terminal of the battery. This relay attracts its armature and the detent 91 holds the armature in its attracted position. This armature, when attracted, closes a switch 92, which is in multiple with the armature switch of relay 89, whereby the solenoid 48 is energized with the results previously described. After the detent 44 has become engaged with the notch 43 consequent upon the closure of the switch 88 or the switch 92, the circuit of the solenoid 48 may be opened either by the release of the switch 88 or by the opening of the switch 92, whichever switch has been operated. If the switch 92 was the operated switch, the detent 91 is released in order that this switch may be opened. To this end I employ a release magnet 93, adapted, when energized, to lift the detent 91 out of engagement with the armature of the relay 90. The release magnet 93 has its circuit closed by the arm 94 upon the rod 39, this arm closing the switch 95 when the rod is turned to permit the detent 44 to enter the notch 43. The switch 95 is in series with the release magnet 93 and in bridge of the battery mains 77 therewith.

In order to rewind instantly upon the complete use of the sheet 16, the switch arm 73 is engaged with button 86 as hitherto stated. The rewinding of the sheet 16 upon the supply roll 1 occurs when the clutch members 11 and 12 are engaged and the gear elements 21 and 22 are out of mesh. This adjustment of these elements is effected, as previously described, when the mounting 38 is lifted. In order to rewind at the conclusion of the record the circuit of the motor continues closed at 78, 79 to continue the chain 9 in operation to positively drive the supply roll in a rewinding direction through the clutch 11, 12. When the rewinding is complete, the arm 69 falls into the space 67 to close switch 72. Circuit for the release magnet 84 is thereupon closed through the switch 72, switch arm 73 and button 86, the motor circuit being consequently opened at 78, 79. After the motor has then been excluded from circuit, the switch arm 73 is positioned to be out of engagement with both buttons 74 and 86 until the instrument is to be again operated, when the arm 73 is engaged with button 74 as hitherto described.

The instrument shown is a musical instrument though the invention is not to be limited thereto. If the instrument is electromagnetically operated it is provided with the switch arms 35 that are respectively individual to the control magnets 96 that are respectively individual to the operating magnets 34 of the ultimate responsive devices which the instrument is designed to operate.

I have shown a suitable form of circuit coupling 97 for joining the responsive devices 34 with their control magnets 96.

Referring to Figs. 13 and 14, the platen 39 there illustrated includes alternated disks 98 and 99 of insulation and metal. The disks electrically replace the arms 35, 36, etc., in the structure of Fig. 1, while the contact arms 100, when bearing upon these disks, are connected with the common side of the circuit and electrically replace the metallic platen 29.

Referring to Figs. 2 and 3, the speed of the operation of the instrument is maintained constant by a governor which is inclusive of a disk 101 slidable upon the motor shaft and coupled therewith by leaf springs 102 which carry centrifugal weights 103. A brake pad 104 is positioned to be engaged by the disk 101 when the speed is excessive, the disk and pad then operating as a brake. The brake pad 104 is mounted upon a spring arm 105 and the position of this spring arm is adjustable by an adjustable button 106 whereby the limiting speed of the motor may be determined.

It is obvious that changes may be made without departing from the spirit of my invention.

Having thus described my invention I claim as new and desire to secure by Letters Patent the following:—

1. Controlling mechanism including a traveling control sheet; a controlling member mounted to be movable in opposite directions; means for moving said controlling member in one direction; a detent in holding relation with the controlling member when the holding member has been moved by this means; an electro-magnet serving to place the detent in one of its alternative positions; and a switch in controlling relation to this magnet and controlled by said sheet, the sheet having engagement with a controlling member of the switch while the sheet is traveling and having a concluding portion enabling an alternative adjustment of the switch.

2. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; and a switch in the magnet circuit to control said magnet, one of said rolls having a recess in the zone of the control sheet and positioned to receive a member of the switch to place the switch in one of its adjustments, said control sheet serving, in being wound, to cover said recess and actuate said switch member to place the switch in an alternative adjustment.

3. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; and a switch in the magnet circuit to control said magnet, the take up roll having a recess in the zone of the control sheet and positioned to receive a member of the switch to place the switch in one of its adjustments, said control sheet serving, in being wound, to cover said recess and actuate said switch member to place the switch in an alternative adjustment.

4. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; and a switch in the magnet circuit to control said magnet, one of said rolls having a formation cooperating with a member of the switch to place the switch in one of its adjustments, said control sheet having a portion cooperating with a member of the switch to place the switch in an alternative adjustment.

5. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; and a switch in the magnet circuit to control said magnet, the take up roll having a formation cooperating with a member of the switch to place the switch in one of its adjustments, said control sheet having a portion cooperating with a member of the switch to place the switch in an alternative adjustment.

6. Controlling mechanism including a traveling control sheet; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; and a switch in controlling relation to the second magnet, said sheet engaging the switch and having a formation presented thereto in the course of the movement of the sheet serving to change the adjustment of the switch.

7. Controlling mechanism including a traveling control sheet; a controlling member mounted to be movable in opposite directions; an electro-magnet for moving said controlling member in one direction; a switch in controlling relation to this magnet and controlled by said sheet; a detent in holding relation with the controlling member when the holding member has been moved by this magnet; a second electro-magnet serving to place the detent in one of its alternative positions; and a switch in controlling relation to the second magnet, said sheet engaging the switch and having a formation presented thereto in the course of the movement of the sheet serving to change the adjustment of the switch.

8. Controlling mechanism including a traveling control sheet; a controlling member mounted to be movable in opposite directions; an electro-magnet for moving said controlling member in one direction; a relay whose armature switch is in controlling relation to this magnet; a switch in controlling relation to the relay and governed by the control sheet; a detent in holding relation with the controlling member when the controlling member has been moved by said magnet; a second electro-magnet serving to place the detent in one of its alternative positions; and a switch in controlling relation to the second magnet and controlled by said sheet.

9. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; and a switch in controlling relation to the second magnet, one of said rolls having a recess in the zone of the control sheet and positioned to receive a member of the latter switch to place this switch in one of its adjustments, said control sheet serving, in being wound, to cover said recess and, when covering the recess, to actuate said switch member to place the switch in an alternative adjustment.

10. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; and a switch in controlling relation to the second magnet, the take up roll having a recess in the zone of the control sheet and positioned to receive a member of the latter switch to place this switch in one of its adjustments, said control sheet serving, in being wound, to cover said recess and actuate said switch member to place the switch in an alternative adjustment.

11. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet and controlled by said sheet; a detent in holding relation with the controlling member when the holding member has been moved by this magnet; a second electro-magnet serving to place the detent in one of its alternative positions; and a switch in controlling relation to the second magnet, one of said rolls having a recess in the zone of the control sheet and positioned to receive a member of the latter switch to place this switch in one of its adjustments, said control sheet serving, in being wound, to cover said recess and actuate said switch member to place the switch in an alternative adjustment.

12. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet and controlled by said sheet which engages the same and has a formation presented to the switch in the course of travel of the sheet to change the adjustment of the switch; a detent in holding relation with the controlling member when the holding member has been moved by this magnet; a second electro-magnet serving to place the detent in one of its alternative positions; and a switch in controlling relation to the second magnet, the take up roll having a recess in the zone of the control sheet and positioned to receive a member of the latter switch to place this switch in one of its adjustments, said control sheet serving, in being wound, to cover said recess and actuate said switch member to place the switch in an alternative adjustment.

13. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a relay whose armature switch is in controlling relation to this magnet; a switch in controlling relation to the relay and governed by the control sheet; a detent in holding relation with the controlling member when the holding member has been moved by this magnet; a second electro-magnet serving to place the detent in one of its alternative positions; and a switch in controlling relation to the second magnet, one of said rolls having a recess in the zone of the control sheet and positioned to receive a member of the latter switch to place this switch in one of its adjustments, said control sheet serving, in being wound, to cover said recess and actuate said switch member to place the switch in an alternative adjustment.

14. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a relay whose armature switch is in controlling relation to this magnet; a switch in controlling relation to the relay and governed by the control sheet; a detent in holding relation with the controlling member when the holding member has been moved by this magnet; a second electro-magnet serving to place the detent in one of its alternative positions; and a switch in controlling relation to the second magnet, the take up roll having a recess in the zone of the control sheet and positioned to receive a member of the latter switch to place this switch in one of its adjustments, said control sheet serving, in being wound, to cover said recess and actuate said switch member to place the switch in an alternative adjustment.

15. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a relay whose armature switch is in controlling relation to this magnet; a switch in controlling relation to the relay and governed by the control sheet; a detent for holding said armature switch in the position to which it is moved by the relay; a release magnet for releasing the detent; a switch in controlling relation to the relay, said controlling member having a portion in closing relation to this switch when the controlling member is positioned by the magnet that moves it; a detent in holding relation with the controlling member when the holding member has been moved by this magnet; a second electro-magnet serving to place the detent in one of its alternative positions; and a switch in controlling relation to the second magnet.

16. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; and a switch in controlling relation to the second magnet, one of said rolls having a formation cooperating with a member of the latter switch to place this switch in one of its adjustments, said control sheet having a portion cooperating with a member of this switch to place this switch in an alternative adjustment.

17. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet and controlled by said sheet, one of said rolls having a formation cooperating with a member of the latter switch to place this switch in one of its adjustments, said control sheet having a portion cooperating with a member of this switch to place this switch in an alternative adjustment.

18. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; a relay whose armature switch is in controlling relation to this magnet; a switch in controlling relation to the relay and governed by the control sheet, one of said rolls having a formation cooperating with a member of the latter switch to place this switch in one of its adjustments, said control sheet having a portion cooperating with a member of this switch to place this switch in an alternative adjustment.

19. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a relay whose armature switch is in controlling relation to this magnet; a switch in controlling relation to the relay and governed by the control sheet, one of said rolls having a formation cooperating with a member of the latter switch to place this switch in one of its adjustments, said control sheet having a portion cooperating with a member of this switch to place this switch in an alternative adjustment.

20. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; a relay whose armature switch is in controlling relation to this magnet; a switch in controlling relation to the relay and governed by the control sheet; a detent for holding said armature switch in the position to which it is moved by the relay; a release magnet for releasing the detent; a switch in controlling relation to the relay, said controlling member having a portion in closing relation to this switch when the controlling member is positioned by the magnet that moves it; a detent in holding relation with the controlling member when the holding member has been moved by this magnet; a second electro-magnet serving to place the detent in one of its alternative positions; and a switch in controlling relation to the second magnet.

21. Controlling mechanism including a traveling control sheet, a controlling member mounted to be movable in opposite directions; an electro-magnet for moving said controlling member in one direction; and a switch in controlling relation to this magnet and controlled by this sheet.

22. Controlling mechanism including a traveling control sheet; a controlling member mounted to be movable in opposite directions; an electro-magnet for moving said controlling member in one direction; a relay whose armature switch is in controlling relation to the magnet; and a switch in controlling relation to the relay and governed by the control sheet.

23. Controlling mechanism including a traveling control sheet; a controlling member mounted to be movable in opposite directions; an electro-magnet for moving said controlling member in one direction; a relay whose armature switch is in controlling relation to the magnet; a switch in controlling relation to the relay and governed by the control sheet; a detent for holding said armature switch in the position to which it is moved by the relay; a release magnet for releasing the detent; a switch in controlling relation to the relay, said controlling member having a portion in closing relation to this switch when the controlling member is positioned by the magnet that moves it; a detent in holding relation with the controlling member when the holding member has been moved by this magnet; a second electro-magnet serving to place the detent in one of its alternative positions; and a switch in controlling relation to the second magnet.

24. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; a switch in the magnet circuit to control said magnet, one of said rolls having a recess positioned to receive a member of the switch to place the switch in one of its adjustments, said control sheet serving to cover and uncover said recess and actuate said switch member to place the switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

25. Controlling mechanism including a control sheet; a supply roll carrying said sheet; a take up roll upon which the sheet may be wound from the supply roll; a controlling member mounted to be movable in opposite directions; means for moving said controlling member in one direction; a detent in holding relation with the controlling member when the holding member has been moved by this means; an electro-magnet serving to place the detent in one of its alternative positions; a switch in the magnet circuit to control said magnet, one of said rolls having a formation cooperating with a member of the switch to place the switch in one of its adjustments, said control sheet having a portion cooperating with a member of the switch to place the switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

26. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; a switch in controlling relation to the second magnet, one of said rolls having a recess in the zone of the control sheet and positioned to receive a member of the latter switch to place this switch in one of its adjustments, said control sheet serving, in being wound, to cover said recess and actuate said switch member to place the switch in an alternative adjustment; two roll driving devices, each roll having such a device individual thereto; and mechanism governed by said controlling member that renders one driving device operative and the other ineffective when the controlling member is moved in one direction, and renders the latter roll driving device operative and the first ineffective when the controlling member is moved in the reverse direction.

27. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction a switch in controlling relation to this magnet and controlled by said sheet; a detent in holding relation with the controlling member when the holding member has been moved by this magnet a second electro-magnet serving to place the detent in one of its alternative positions; a switch in controlling relation to the second magnet, one of said rolls having a recess in the zone of the control sheet and positioned to receive a member of the latter switch to place this switch in one of its adjustments, said control sheet serving, in being wound, to cover said recess and actuate said switch member to place the switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

28. Controlling mechanism including a control sheet; a supply roll carrying said sheet; a take up roll upon which the sheet may be wound from the supply roll, a controlling member mounted to be movable in opposite directions; an electro-magnet for moving said controlling member in one direction; a relay whose armature switch is in controlling relation to this magnet; a switch in controlling relation to the relay and governed by the control sheet; a detent in holding relation with the controlling member when the holding member has been moved by this magnet; a second electro-magnet serving to place the detent in one of its alternative positions; a switch in controlling relation to the second magnet, one of said rolls having a recess in the zone of the control sheet and positioned to receive a member of the latter switch to place this switch in one of its adjustments, said control sheet serving, in being wound, to cover said recess and actuate said switch member to place the switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

29. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; a switch in controlling relation to the second magnet, one of said rolls having a formation cooperating with a member of the latter switch to place this switch in one of its adjustments, said control sheet having a portion cooperating with a member of this switch to place this switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

30. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet and controlled by said sheet, one of said rolls having a formation cooperating with a member of the latter switch to place this switch in one of its adjustments, said control sheet having a portion cooperating with a member of this switch to place this switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

31. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a switch in controlling relation to this magnet; a detent in holding relation with the controlling member when the holding member has been moved by this magnet; a second electro-magnet serving to place the detent in one of its alternative positions; a relay whose armature switch is in controlling relation to this magnet; a switch in controlling relation to the relay and governed by the control sheet, one of said rolls having a formation cooperating with a member of the latter switch to place this switch in one of its adjustments, said control sheet having a portion cooperating with a member of this switch to place this switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

32. Controlling mechanism including a control sheet; a supply roll carrying said sheet; a take up roll upon which the sheet may be wound from the supply roll; a controlling member mounted to be movable in opposite directions; an electro-magnet for moving said controlling member in one direction; a relay whose armature switch is in controlling relation to this magnet; a switch in controlling relation to the relay and governed by the control sheet, one of said rolls having a formation cooperating with a member of the latter switch to place this switch in one of its adjustments, said control sheet having a portion cooperating with a member of this switch to place this switch in an alternative adjustment; two roll driving devices, each roll having such a device individual thereto; and mechanism governed by said controlling member that renders one roll driving device operative and the other ineffective when the controlling member is moved in one direction, and renders the latter roll driving device operative and the first ineffective when the controlling member is moved in the reverse direction.

33. Mechanism of the kind described including a traveling control sheet; a cooperating element movable toward and from the same; and electromagnetic means for lifting said element in advance of any reverse or backward movement of the control sheet; means for latching said element in lifted position; an auxiliary circuit adapted to be closed by the element lifting mechanism after the element has been latched in raised position; and electromagnetically operated means in the auxiliary circuit adapted to break the lifting circuit.

34. Mechanism of the kind described including a perforated sheet; a roll; a take up roll; means for automatically reversing the direction of the motion of the sheet before it is fully unwound from the first roll, and means for manually stopping, starting and reversing the direction of the movement of the strip at any point of its movement.

35. The combination with a controlling sheet; of a supply roll upon which said strip is wound; mechanism for unwinding the sheet from the roll; mechanism for rewinding the strip upon the roll; and manually controlled mechanism in governing relation to the unwinding mechanism and rewinding mechanism whereby different portions of the sheet may be caused to function to the exclusion of the balance of the sheet.

36. The combination with a controlling sheet; of a supply roll upon which said sheet is wound; mechanism for unwinding the strip from the roll; switches mechanically governed by the sheet; circuits in which said switches are governed; relays in the circuits; other circuits governed by said relays; and responsive devices in the latter circuits.

37. The combination with a supply roll; of a take up roll; a controlling sheet assembled with both rolls; mechanism for turning the take up roll to wind the sheet thereon and including an electro-magnet for setting it into operation; and a switch governing the circuit of the electro-magnet, said switch having a member for operating it and said sheet having a formation mechanically cooperating with said member to effect the operation of the switch.

38. The combination with a supply roll; of a take up roll; a controlling sheet assembled with both rolls; mechanism for turning the take up roll to wind the sheet thereon and including an electro-magnet for setting it into operation; and a switch governing the circuit of the electro-magnet, said switch having a member for operating it and bearing upon said sheet which has a cut away portion permitting movement of said member to operate said switch.

39. The combination with a supply roll; of a take up roll; a controlling sheet assembled with both rolls; mechanism for turning the supply roll to rewind the sheet thereon and including an electro-magnet for setting it into operation; and a switch governing the circuit of the electro-magnet, said switch having a member for operating it and said sheet having a formation mechanically cooperating with said member to effect the operation of the switch.

40. The combination with a supply roll; of a take up roll; a controlling sheet assembled with both rolls; mechanism for turning the supply roll to rewind the sheet thereon and including an electro-magnet for setting it into operation; and a switch governing the circuit of the electro-magnet, said switch having a member for operating it and bearing upon said sheet which has a cut away portion permitting movement of said member to operate said switch.

41. The combination with a supply roll; of a take up roll; a controlling sheet assembled with both rolls; rewinding mechanism for rewinding the sheet upon the supply roll and including an electro-magnet for setting it into operation; and a switch governed by said sheet to close the circuit of the magnet when a predetermined amount of the sheet has been unwound from the supply roll, to rewind the sheet upon the supply roll.

42. The combination with a supply roll; of a take up roll; a controlling sheet assembled with both rolls; electric switches; said sheet having formations for operating said switches; responsive devices in circuits governed by said switches; and mechanism governed by said sheet for lifting said switches out of cooperative relation with the sheet when the sheet has travelled a predetermined extent.

In witness whereof, I hereunto subscribe my name.

FREDERICK B. LITTLE.